(12) United States Patent
Black et al.

(10) Patent No.: US 7,933,571 B2
(45) Date of Patent: Apr. 26, 2011

(54) METHOD AND APPARATUS FOR SELECTING A COMMUNICATION MODE BASED ON ENERGY SOURCES IN A HYBRID POWER SUPPLY

(75) Inventors: Greg R. Black, Vernon Hills, IL (US); Robert S. Witte, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 407 days.

(21) Appl. No.: 11/765,764

(22) Filed: Jun. 20, 2007

(65) Prior Publication Data

US 2008/0318535 A1 Dec. 25, 2008

(51) Int. Cl.
*H01Q 11/12* (2006.01)
*H04B 1/16* (2006.01)

(52) U.S. Cl. ............. 455/127.5; 455/343.1; 455/343.5

(58) Field of Classification Search .............. 455/572, 455/573, 575, 575.1, 127.1, 127.5, 343.1, 455/343.5, 550.1
See application file for complete search history.

(56) References Cited

U.S. PATENT DOCUMENTS

| | | | |
|---|---|---|---|
| 5,893,036 A | 4/1999 | Trandai et al. | |
| 5,940,756 A | 8/1999 | Sibecas et al. | |
| 5,949,484 A * | 9/1999 | Nakaya et al. | 348/384.1 |
| 6,021,332 A * | 2/2000 | Alberth et al. | 455/552.1 |
| 6,087,949 A | 7/2000 | Yanagida | |
| 6,118,248 A * | 9/2000 | Gartstein et al. | 320/107 |
| 6,275,712 B1 * | 8/2001 | Gray et al. | 455/522 |
| 6,397,061 B1 | 5/2002 | Jordan et al. | |
| 6,710,578 B1 | 3/2004 | Sklovsky | |
| 6,748,246 B1 | 6/2004 | Khullar | |
| 6,970,439 B2 | 11/2005 | Bi et al. | |
| 7,062,250 B1 * | 6/2006 | Kosaka | 455/343.5 |
| 7,161,916 B2 * | 1/2007 | Malladi et al. | 370/332 |
| 7,242,920 B2 * | 7/2007 | Morris | 455/405 |
| 2002/0131396 A1 | 9/2002 | Knuutila et al. | |
| 2003/0165152 A1 | 9/2003 | Mills et al. | |
| 2004/0085940 A1 | 5/2004 | Black et al. | |
| 2004/0121793 A1 | 6/2004 | Weigele et al. | |
| 2004/0204091 A1 | 10/2004 | Liu et al. | |
| 2007/0123314 A1 | 5/2007 | Ragan | |
| 2007/0208521 A1 | 9/2007 | Petite et al. | |

FOREIGN PATENT DOCUMENTS

| | | |
|---|---|---|
| EP | 1193885 A2 | 3/2002 |
| GB | 2339113 A1 | 1/2000 |
| GB | 2355367 A | 4/2001 |
| JP | 8-289366 A | 11/1996 |
| JP | 9-307496 A | 11/1997 |
| JP | 9-326749 A | 12/1997 |
| JP | 11-298341 A | 10/1999 |
| JP | 2000-324022 A | 11/2000 |
| JP | 2002-165261 A | 6/2002 |
| KR | 100205783 B1 | 6/1999 |
| WO | 9302505 A1 | 2/1993 |
| WO | 9633555 A1 | 10/1996 |
| WO | 0001094 A1 | 1/2000 |
| WO | 0031990 A2 | 6/2000 |

OTHER PUBLICATIONS

International Search Report dated Nov. 27, 2008.

* cited by examiner

*Primary Examiner* — Sonny Trinh

(57) ABSTRACT

A method and apparatus that transmits data transmission in a wireless communication device having a power supply that includes a plurality of power sources is disclosed. The method may include determining an amount of data to be transferred, determining at least one available communication mode, determining a power state of the power supply including an available amount of energy at a corresponding amount of at least one of power and current, selecting at least one communication mode based on the power state of the power supply and the amount of data to be transferred, and transferring the data using the selected at least one communication modes.

29 Claims, 4 Drawing Sheets

METHOD AND APPARATUS FOR SELECTING A COMMUNICATION MODE BASED ON ENERGY SOURCES IN A HYBRID POWER SUPPLY

BACKGROUND OF THE DISCLOSURE

1. Field of the Disclosure

The disclosure relates to power supply management for mobile communication devices.

2. Introduction

Hybrid energy supplies can only provide peak power for a short time. The hybrid method is to employ a high power/low energy, device such as a capacitor or battery, in parallel with a low power/high energy supply such as a battery or fuel cell. For example, a fuel cell having high series resistance R has its practical output power capability of roughly V squared divided by 10 R, and a small battery or large capacitor having much lower resistance, is provided in parallel.

Multi-mode communications equipment provides data transfer at multiple rates depending on the mode. Multi-mode products allow differing data rates depending on the service type selected. One of the problems to be addressed is the determination of what data mode should be selected. Usually the lowest energy approach uses lower data rates for lower length transmissions and higher data rates for higher length transmissions. This approach makes sense because there is typically a higher amount of processing overhead, and a corresponding amount of overhead energy dissipation, needed for high rate transmissions. For longer transmissions, the energy saved due to lower energy dissipation per transmitted bit exceeds the overhead dissipation.

If the power drain from a high data rate mode exceeds the power supply capability of a high energy supply, one or more high power/low energy supplies may be added, forming a hybrid power supply. However, there is a problem in that the high power/low energy supplies may not be able to sustain a high power transmission for a long period of time. This occurs if the amount of data is large enough that the required energy for its transmission exceeds the energy available from the high power/low energy supply.

SUMMARY OF THE DISCLOSURE

A method and apparatus that transmits data transmission in a wireless communication device having a power supply that includes a plurality of power sources is disclosed. The method may include determining an amount of data to be transferred, determining at least one available communication mode, determining a power state of the power supply including an available amount of energy at a corresponding amount of at least one of power and current, selecting at least one communication mode based on the power state of the power supply and the amount of data to be transferred, and transferring the data using the selected at least one communication modes.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Figure 1:
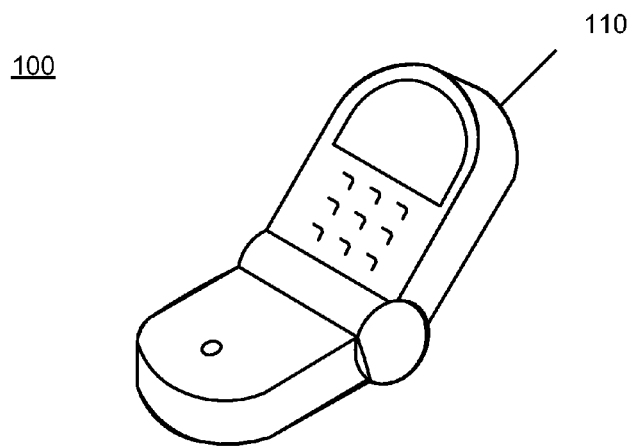
FIG. 1 is an exemplary diagram of a mobile communication device in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

This disclosure may concern systems having hybrid supplies, in which the power capability of at least one of the sources is less than the power dissipation of at least one of the communication modes.

The disclosure also concerns multi-rate communications allowing user equipment with data transfer rate capability according to a rate class. A multi-rate communication device, for example, may have be a General Packet Radio Services (GPRS) multi-slot communications device having multi-slot classes which allow for differing up-link and down-ling data rates, depending on the number of GPRS timeslots allocated. Similarly a code division multiple access (CDMA) system may provide multiple rate classes depending on the coding and number of channels employed. While the rate classes may be rigidly defined a device may transmit a total amount of data in multiple transmissions interrupted by idle periods or periods of reduced rate transmissions.

We use the word mode to describe the rate class, and this concept is extended with true multi-mode products which allow differing data rates depending on the service type selected. Examples of multimode products are 2G/3G wide area network (WAN) products or WAN/local area network (LAN) products. There are typically multiple rates available for each mode.

Operation at a higher data rate generally requires higher power drain from the energy supply, but may actually require less total energy. A problem with always selecting the highest data rate or lowest energy is that the energy supply may not be capable of providing the required power for the time needed to complete the communication. This is especially problematic in devices employing hybrid supplies, in which the energy sources may only be able to provide peak power for a short duration.

For example, a fuel cell having high series resistance, R, has its practical output power capability of roughly V squared divided by 10 R. Thus a power limit of a supply may be approximated if the series resistance is known. Alternatively, a current limit above which the supply may not be used might be used in lieu of a power limit.

Other approximations of the power capability, with more or less accuracy, can be made. For example, different scaling factors could be applied to the series resistance-based limit calculation. Recognizing that the power limit is actually the limit of all of the sources to supply power for a period of time needed to deplete the energy of one source, a supply resistance can be calculated as the parallel combination of the supply resistances of each source having available energy above the required amount. In such a way, the calculation or electrical simulation of an equivalent circuit of the power supply can be approximated given the communication mode dependant load. A more accurate approach might employ a non-linear model of the voltage versus current behavior of the sources and take into account other effects such as reactive impedance, hysteresis, and aging.

The hybrid method of using limited power energy systems may be to employ a low impedance capacitor or battery in parallel with a higher impedance source. However, conventional hybrid energy systems have only a limited amount of energy available at high power. It is, of course, well known that the product of power and time is energy. When high power drain continues for a long period of time, the energy stored in the low impedance capacitor or battery gets depleted, the voltage is reduced, and more current is supplied from the high energy/low power supply. However, because of the voltage drop across the series resistance, the high energy/low power supply voltage is also reduced, and the voltage becomes too low to continue the data transfer. The undesired consequence of low energy is low voltage which may result in unplanned interruption of data transfer, operational failure such as loss of data, and sudden turn-off. Thus, it is important to consider the available energy from each of the power supplies at the power level required for the communication mode selected.

There are various methods of determining the available energy of a source. Methods include simple voltage based energy approximations employing a direct calculation or look-up table approach. In the case of a super-capacitor, a direct calculation could be $C*V^2/2 - C*V_{MIN}^2/2$, where V is the starting voltage, C is the capacitance and $V_{MIN}$ is the minimum supply voltage. More accurate approaches may take into consideration other variables besides voltage, such as resistance and current drain at the time of voltage measurement, integrated power or current drain over time, etc. The method of approximating energy by integrating current drain over time is also known as coulomb counting, in which the time integral of current drain is subtracted from a starting amount of charge. It being well known that energy is charge time voltage, in this disclosure we use the words charge and energy interchangeably to describe the available energy in a source. Similarly we use the words power drain and current drain interchangeably to describe the removal of stored energy from a source. For example, coulomb counting, while actually a method of approximating charge, is equivalent to approximating energy. In this disclosure we use the words power supply and energy supply interchangeably to collectively describe the energy sources.

This disclosure also concerns a multi-mode hybrid power communications device having a plurality of energy sources. The communication mode may be selected according to factors such as available communication mode data rates, power dissipation per mode, power capability, energy capacity, and the amount of data to be transferred. In this manner, the communication mode may be selected to maximize the data rate or minimize the time to transfer an amount of data, or to minimize energy dissipation, for example. Thus, high data rates may be permitted as long as the voltage remains high enough that all of the data can be transferred, or without depleting an energy source.

FIG. 1 illustrates an exemplary mobile communication device 100 in accordance with a possible embodiment of the disclosure. In particular, the mobile communication device 100 may include a casing 110 which may house a power source for the mobile communication device 100.

The mobile communication device 100 may be a multi-mode mobile communication device which transfers different types of data (e.g., voice, text, media, data, etc.) using different transmission modes at different data rates. In this manner, the mobile communication device 100 may be a portable MP3 player, satellite radio receiver, AM/FM radio receiver, satellite television, portable music player, portable laptop, portable computer, wireless radio, wireless telephone, portable digital video recorder, cellular telephone, mobile telephone, or personal digital assistant (PDA), combinations of the above, for example.

The casing 110 may be made at any durable synthetic or metal material capable of housing components of the mobile communication device 100, including a power supply.

Figure 2:
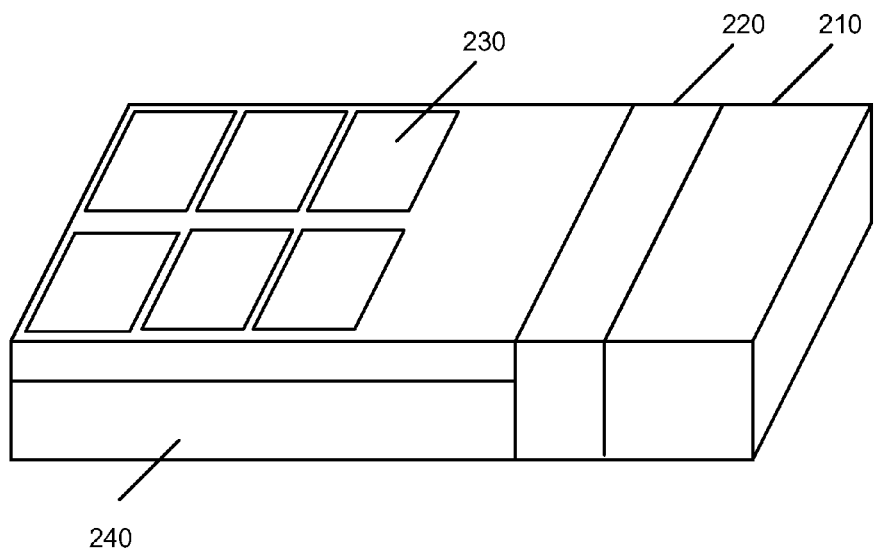
FIG. 2 is a diagram of a hybrid power supply in accordance with a possible embodiment of the disclosure.

FIG. 2 is a diagram of an exemplary power supply 200 in accordance with a possible embodiment of the disclosure. The power supply 200 may be a hybrid power supply having multiple power sources available to provide power to the mobile communication device 100. The hybrid power supply 200 may include a battery 210, a super capacitor 220, fuel cells 230, and fuel 240. The power supply 200 has more energy than a battery of similar size, but the energy comes from different sources in parallel. In this example there are three. Each source has a different power capability as determined by the series resistance. For example, peak power may only be available only from the super capacitor 220, which may have only a small amount of energy. A super capacitor may be a large capacitor typically on the order of 1F or greater, for example an electrochemical capacitor.

Figure 3:
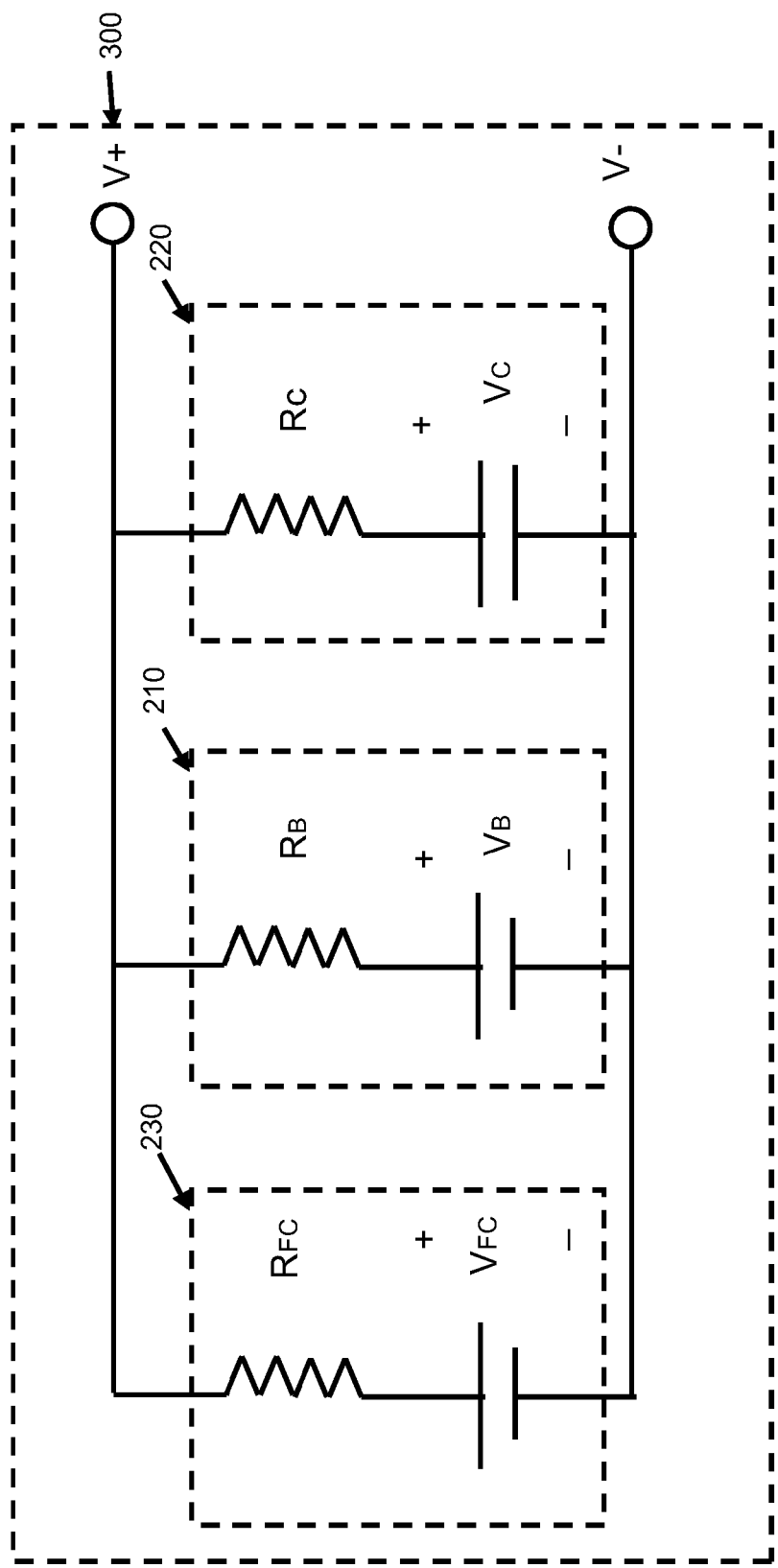
FIG. 3 is an electrical schematic diagram of a hybrid power supply in accordance with a possible embodiment of the disclosure.

FIG. 3 is an electrical schematic diagram of the power supply 300, where each source 210, 220, 230 is modeled by a voltage source or capacitor with a series resistor. As an example, Table 1 below shows the available energy and resistance for each of associated with the electrical elements in FIG. 3.

TABLE 1

|  | Fuel Cell | Small Battery (50 mA/hours) | Electro-chemical Capacitor (3 F) |
|---|---|---|---|
| Energy Available (Joule) | 8.0E+07 | 6.8E+02 | 1.0E+01 |
| Resistance (Ohms) | 5.00 | 0.40 | 0.10 |

For each source, a current limit or power limit may be calculated. An example of a current limit calculation is $I_{max}=V/(10*R)$. An example of a power limit calculation is $P_{max}=V^2/(10*R)$. In these limit calculations, the value of R may be just the series resistance for the source, or the parallel combination of series resistance for the source and the series resistance of the other sources with higher available energy. Various other approximations can be made of power capability.

Figure 4:
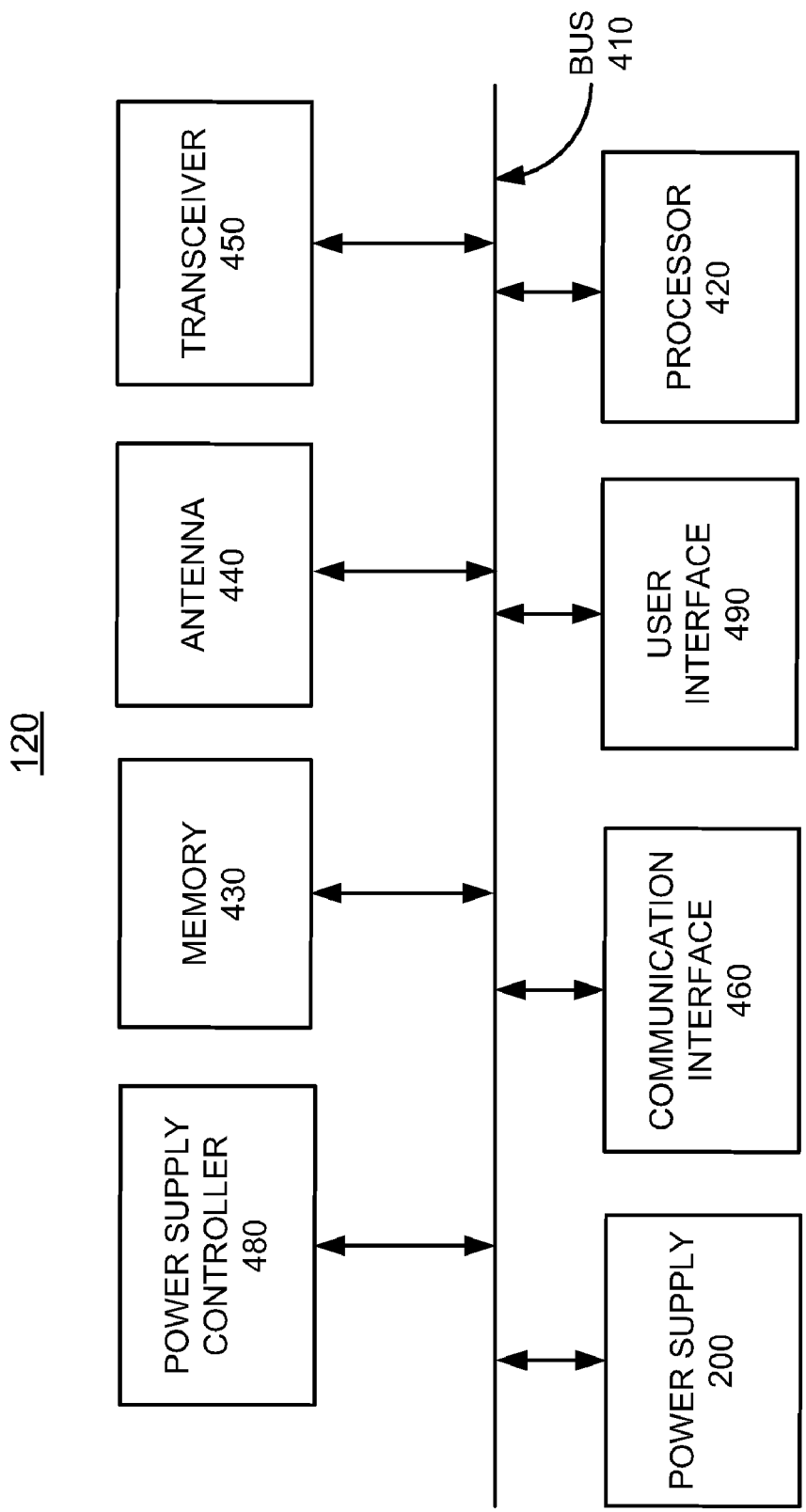
FIG. 4 illustrates an exemplary block diagram of a mobile communication device in accordance with a possible embodiment of the disclosure.

FIG. 4 illustrates a block diagram of an exemplary mobile communications device 100 in accordance with a possible embodiment of the disclosure. The mobile communications device 100 may include a bus 410, a processor 420, a memory 430, an antenna 440, a transceiver 450, a communication interface 460, a power supply 200 (described above in FIG. 2), a power supply controller 480, and a user interface 490. Bus 410 may permit communication among the components of the mobile communication device 100.

Processor 420 may include at least one conventional processor or microprocessor that interprets and executes instructions. Memory 430 may be a random access memory (RAM) or another type of dynamic storage device that stores information and instructions for execution by processor 420. Memory 430 may also include a read-only memory (ROM) which may include a conventional ROM device or another type of static storage device that stores static information and instructions for processor 420.

Transceiver 450 may include one or more transmitters and receivers. The transceiver 450 may include sufficient functionality to interface with any network or communications station and may be defined by hardware or software in any manner known to one of skill in the art. The processor 420 is cooperatively operable with the transceiver 450 to support operations within the communications network. The transceiver 450 transmits and receives transmissions via one or more the antennae 440 in a manner known to those of skill in the art.

Communication interface 460 may include any mechanism that facilitates communication via a communications network. For example, communication interface 460 may include a modem. Alternatively, communication interface 460 may include other mechanisms for assisting the transceiver 450 in communicating with other devices and/or systems via wireless connections.

User interface 490 may include one or more conventional input mechanisms that permit a user to input information and communicate with the mobile communication device 100, such as a display, microphone, touchpad, keypad, keyboard, mouse, pen, stylus, voice recognition device, buttons, one or more speakers, etc.

The mobile communication device 100 may perform such functions in response to processor 420 and/or power supply controller 480 by executing sequences of instructions contained in a computer-readable medium, such as, for example, memory 430. Such instructions may be read into memory 430 from another computer-readable medium, such as a storage device or from a separate device via communication interface 460. For illustrative purposes, the functions of the power supply controller 480 and the communication mode selection process will be described below in relation to the block diagrams shown in FIGS. 1-4.

Figure 5:
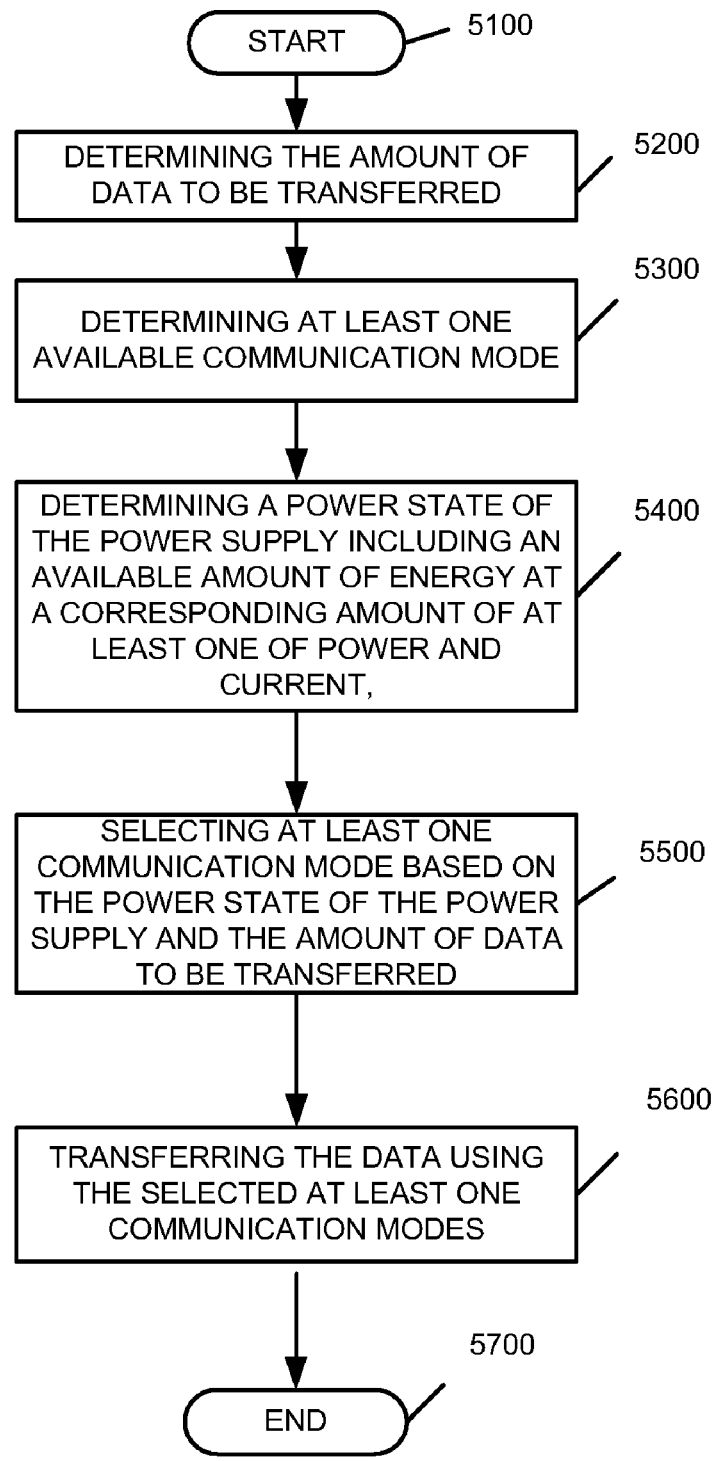
FIG. 5 is an exemplary flowchart illustrating one possible communication mode selection process in accordance with one possible embodiment of the disclosure.

FIG. 5 is an exemplary flowchart illustrating some of the basic steps associated with a possible communication mode selection process in accordance with a possible embodiment of the disclosure. The process begins at step 5100 and continues to step 5200, where the power supply controller 480 may determine the amount of data to be transferred. For example, the file size of a data file to be transmitted e.g., various media file types including movies, music, images, videos, recorded audio, and other popular file types. At step 5300, the power supply controller 480 may determine the available communication modes. The step of determining available communication modes may involve detecting hardware or software capability of the device and detecting network availability for each capability.

At step 5400, the power supply controller 480 may determine a power state of the power supply including an available amount of energy at a corresponding amount of at least one of power and current. The power supply controller 480 may select at least one communication mode based on the power state of the power supply and the amount of data to be transferred and transfer the data using the selected at least one communication modes.

Alternatively, the power supply controller 480 may also consider the power sourcing capability and available energy level of each power source in the power supply 200. The energy level may be determined by measuring the voltage levels, or by any other method known to those of skill in the art. The power sourcing capability may be determined from the amount of series resistance existing for each power supply which may be measured or read from memory 430, or from other power capability properties such as a current or power limit that may be measured or read from memory 430. A resistance measurement may be done by measurement of voltage at a known current drain. The combined power sourcing capability and energy level of a source may be the power state of the source The power supply controller 480 may determine the remaining energy level of each source in the power supply after the transfer of data, per communication mode. The available energy may be the energy level from minus the amount of energy per communication mode to transfer the data. Alternatively the determination may more simply be a determination of energy sufficiency that is a determination that the remaining energy is greater than a minimum energy amount. It may not be necessary to look up or calculate the remaining energy for each source and communication mode, provided that there is sufficient energy remaining for a single energy source at a preferred communication mode. Preferred communication modes may be the modes with the lowest energy dissipation or the fastest data transfer time.

At step 5500, the power supply controller 480 may select the communication mode to be used to transfer the data based on the power state of the power supply and the amount of data to be transferred. The power supply controller 480 may also consider the amount of power dissipated and energy needed per communication mode to transfer the amount of data, the power sourcing capability and available energy from each of the plurality of power sources in the power supply, and the remaining energy level after data transfer of each of the plurality of power sourced in the power supply. At step 5600, the power supply controller 480 may transfer the data using the selected at least one communication modes. The process goes to step 5700, and ends.

Alternatively at step 5600, the power supply controller may instead select the preferred communication mode, regardless of whether the power supply has sufficient energy and power to transfer the full amount of data. Instead the power supply controller may choose to transmit a first amount of data less than the total amount of the data in to transfer multiple transmissions, with a delay between the first and subsequent transmissions for recharging of the high power/low energy supply from a low power/high energy supply.

In this manner, the multi-mode communications device 100 may have m communication modes having power dissipation P(m) and data rate R(m), where P(m) is a function of RF transmit power level and other communication network conditions at the time of data transfer. Alternatively, each communication mode may have a current drain I(m)=P(m)/V. For a the amount of data to be transferred, D, there is a transfer time, T(m) D/R(m), and an overhead time $T_{OH}(m)$ which is a fixed value accounting for time to acquire a local area connection, for example. The total data transfer time is then $T_{TOT}(m)=T(m)+T_{OH}(m)$ for each communication mode. For each communication mode there is an energy drain E(m)= $T_{TOT}(m)*P(m)$. The mobile communication device 100 may have n energy sources present having maximum power drain P(n) and available energy E(n), where P(n) and E(n) may be a function of supply voltage V and supply resistance R. Alternatively, each source may have a maximum current drain I(n)=P(n)/V.

The communication mode may be selected depending on the amount of data to be transferred D, power level remaining, and supply voltage required. A communication mode m may be chosen which for a single n satisfies: A power constraint whereby the power drain is less than maximum power drain, P(m)<P(n), and an energy constraint whereby the energy drain is less than the available energy, E(m)<E(n). Alternatively the preferred communication mode may be selected for multiple transmissions, with the amount of data in each partial transmission and the amount of time between each partial transmission chosen such that P(m)<P(n) and E(m)<E(n) for each partial transmission In this manner, the mode m may be selected, either with a single transmission or with partial transmissions, to minimize the total data transfer time $T_{TOT}$ or to minimize energy dissipation=PD(m)*D/R, for example. It should be noted that in actual practice it may not be necessary to determine all of the power and energy limits for each mode.

Furthermore, it may not be necessary to determine the available power and energy for each of the sources. The determination of the power and energy limits and available power and energy may be stopped when a single communication mode is found having lower power and energy requirements than the available power and energy for a single source by calculating the limit amounts in order of the final selection criteria. For example, if the final selection criterion is the minimization of transfer time, then the available communication mode having the lowest energy drain might be considered first, and if it meets the criteria of a single supply having sufficient available power and energy then that mode would be selected. Similarly, a supply with higher power and lower energy might be chosen as the supply for which the available power and energy is first determined, since it is most likely to meet the requirements of the higher data rate communication mode. Consider the example shown in Table 2 below where there are m=5 communication modes available, and n=3 energy sources:

TABLE 2

| Supply Voltage, V: | 3.8 | | | | |
| Minimum voltage | 2.8 | | | | |
| Amount of data to be transferred (Mbyte): | 10 | | | | |

| | Communication mode, m: | | | | |
| --- | --- | --- | --- | --- | --- |
| | 1<br>GPRS<br>1 slot | 2<br>EGPRS<br>4 slot | 3<br>UMTS | 4<br>WLAN | 5<br>UWB |
| Data Rate, R(m) (Mbit/sec) | 0.01 | 0.10 | 0.35 | 2.00 | 50.00 |
| Current drain (A) | 0.15 | 0.45 | 0.40 | 0.50 | 1.10 |
| Minimum Supply Resistance (Ohms) | 2.53 | 0.84 | 0.95 | 0.76 | 0.35 |
| Time to transfer (sec) | 125.0 | 12.5 | 3.57 | 0.625 | 0.025 |
| Overhead time (sec) | 0.10 | 0.10 | 0.10 | 2.00 | 2.00 |
| Total Time (sec) | 125.10 | 12.60 | 3.67 | 2.63 | 2.03 |
| Power drain, P(m) (W) | 0.5 | 1.6 | 1.4 | 1.8 | 3.9 |
| Energy drain, E(m) (Joule) | 65.7 | 19.8 | 5.1 | 4.6 | 7.8 |

| | Source component, n: | | |
| --- | --- | --- | --- |
| | 1<br>Fuel Cell | 2<br>Small Battery<br>50<br>(mA hours) | 3<br>Electrochemical Capacitor<br>3<br>(F.) |
| Resistance (Ohms) | 3.00 | 0.80 | 0.20 |
| Maximum Current Drain (A) | 0.13 | 0.48 | 1.90 |
| Power Available, P(n) (W) | 0.5 | 1.8 | 7.2 |
| Energy Available, E(n) (Joule) | 8.0E+07 | 6.8E+02 | 9.90 |

As shown in Table 2, the amount of data to be transferred is 10 Mbytes, the voltage is 3.8V, and the minimum voltage is 2.8V. The GPRS 1 slot (m=1) communication mode has lower power and energy drain (0.5 W and 656 Joule) than the power and energy available from the fuel cell (n=1) source (0.5 W, 8.0 E7 Joule), so the GPRS 1 slot mode can be selected. Also, EGPRS 4 slot, UMTS, and WLAN (m=2 to 4) meet the criteria of having lower power and energy drain than the power and energy available from the small battery (n=2), so these modes can be selected.

Finally, the UWB (m=5) communication mode has lower power and energy drain than the power and energy available from the electrochemical capacitor (n=3) so the UWB mode can be selected. So, the power source is capable of supplying all of the communication modes, and the WLAN (m=4) communication mode may be chosen for the lowest energy drain (4.6 Joules), or the UWB (m=5) communication mode for the lowest total transfer time (2.03 sec).

Consider the example shown in Table 3 below which is the same as the example tabulation of Table 2 except the amount of data to be transferred is now 100 Mbytes:

TABLE 3

| | | | | | |
|---|---|---|---|---|---|
| Supply Voltage, V: | 3.8 | | | | |
| Minimum voltage | 2.8 | | | | |
| Amount of data to be transferred (Mbyte): | 100 | | | | |

| | Communication mode, m: | | | | |
|---|---|---|---|---|---|
| | 1<br>GPRS<br>1 slot | 2<br>EGPRS<br>4 slot | 3<br>UMTS | 4<br>WLAN | 5<br>UWB |
| Data Rate, R(m) (Mbit/sec) | 0.01 | 0.10 | 0.35 | 2.00 | 50.00 |
| Current drain (A) | 0.15 | 0.45 | 0.40 | 0.50 | 1.10 |
| Minimum Supply Resistance (Ohms) | 2.53 | 0.84 | 0.95 | 0.76 | 0.35 |
| Time to transfer (sec) | 1,250.0 | 125.0 | 35.71 | 6.250 | 0.250 |
| Overhead time (sec) | 0.10 | 0.10 | 0.10 | 2.00 | 2.00 |
| Total Time (sec) | 1250.10 | 125.10 | 35.81 | 8.25 | 2.25 |
| Power drain, P(m) (W) | 0.5 | 1.6 | 1.4 | 1.8 | 3.9 |
| Energy drain, E(m) (Joule) | 656.3 | 197.0 | 50.1 | 14.4 | 8.7 |

| | Source component, n: | | |
|---|---|---|---|
| | 1<br>Fuel Cell | 2<br>Small Battery<br>50 (mA hours) | 3<br>Electrochemical Capacitor<br>3 (F.) |
| Resistance (Ohms) | 3.00 | 0.80 | 0.20 |
| Maximum Current Drain (A) | 0.13 | 0.48 | 1.90 |
| Power Available, P(n) (W) | 0.5 | 1.8 | 7.2 |
| Energy Available, E(n) (Joule) | 8.0E+07 | 6.8E+02 | 9.90 |

As shown in Table 3, the available power and energy are unchanged for each source, the power drain is unchanged for each mode, but the energy drain has increased for each mode. Once again, for each communication mode, m, there is a source, n, for which the power and energy drain is less than the available power and energy. In this case, the UWB (m=5) communication mode would be chosen for having both the lowest energy drain (8.7 Joule) and the lowest total transfer time (2.25 sec). Consider the example shown in Table 4 below, which is the same as the example tabulation of Tables 2 and 3 except that the amount of data to be transferred is now 1000 Mbytes:

TABLE 4

| Supply Voltage, V: | 3.8 |
|---|---|
| Minimum voltage | 2.8 |
| Amount of data to be transferred (Mbyte): | 1000 |

| | Communication mode, m: | | | | |
|---|---|---|---|---|---|
| | 1 GPRS 1 slot | 2 EGPRS 4 slot | 3 UMTS | 4 WLAN | 5 UWB |
| Data Rate, R(m) (Mbit/sec) | 0.01 | 0.10 | 0.35 | 2.00 | 50.00 |
| Current drain (A) | 0.15 | 0.45 | 0.40 | 0.50 | 1.10 |
| Minimum Supply Resistance (Ohms) | 2.53 | 0.84 | 0.95 | 0.76 | 0.35 |
| Time to transfer (sec) | 12,500.0 | 1,250.0 | 357.14 | 62.500 | 2.500 |
| Overhead time (sec) | 0.10 | 0.10 | 0.10 | 2.00 | 2.00 |
| Total Time (sec) | 12500.10 | 1250.10 | 357.24 | 64.50 | 4.50 |
| Power drain, P(m) (W) | 0.5 | 1.6 | 1.4 | 1.8 | 3.9 |
| Energy drain, E(m) (Joule) | 6562.6 | 1968.9 | 500.1 | 112.9 | 17.3 |

| | Source component, n: | | |
|---|---|---|---|
| | 1 Fuel Cell | 2 Small Battery 50 (mA hours) | 3 Electrochemical Capacitor 3 (F.) |
| Resistance (Ohms) | 3.00 | 0.80 | 0.20 |
| Maximum Current Drain (A) | 0.13 | 0.48 | 1.90 |
| Power Available, P(n) (W) | 0.5 | 1.8 | 7.2 |
| Energy Available, E(n) | 8.0E+07 | 6.8E+02 | 9.90 |

As shown Table 4, the available power and energy are again unchanged for each source, the power drain is unchanged for each mode, but the energy drain has increased for each mode. For the UWB communication mode (m=5), there is not a single source which has available power and energy which is greater than the power and energy drain.

The power drain (3.9 W exceeds the available power for all sources except the electrochemical capacitor (m=3), but the energy drain (17.3 Joules) exceeds the energy available from that source. If the UWB communication mode were chosen, the electrochemical capacitor charge would be depleted, and I*R voltage drop of the voltage of the remaining sources could cause the supply voltage go below the minimum voltage before the data transfer is completed. One option is to choose the WLAN (m=4) communication mode, which of the remaining modes which meet our criteria, has the lowest energy drain (112.9 Joule) and the lowest total transfer time (64.5 sec). Another approach would be that the data is sent in two transmissions, with a time delay between the two transmission of sufficient duration to allow the lower power/higher energy sources to recharge the higher power/lower energy sources. Another approach would be that a first transmission is sent using a one communication mode, and a second transmission using another communication mode. Note that in all of the examples a power supply voltage of 3.8V is assumed. Considering what would happen for the case of lower voltage in the second example of table 3, if the voltage were 3.4V then the available energy from the electrochemical capacitor, approximated by $C*V^2/2 - C*V_{MIN}^2/2$, would be only 5.6 Joules, which is insufficient to transmit the total amount of data using the UWB mode. Thus, the alternatives described in the third example may be required for cases of lesser available energy. In this way, the selected communication mode or first amount of data to transfer may be selected depending on the power state, for example the voltage, of the power supply as well as the amount of data to transfer.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the power supply controller 480 in FIG. 4 each processing the content in various possible ways. It does not necessarily need to be one system used by all end users. Accordingly, the appended claims and their legal equivalents should only define the disclosure, rather than any specific examples given.

We claim:

1. A method for data transmission in a wireless communication device, the wireless communication device having a power supply, comprising:
   determining an amount of data to be transferred;
   determining at least one available communication mode;
   determining a power state of the power supply including an available amount of energy at a corresponding amount of at least one of power and current;
   selecting at least one communication mode based on the determined available amount of energy of the power supply and the determined amount of data to be transferred; and
   transferring the data using the selected at least one communication mode.

2. The method of claim 1, wherein in the step of selecting at least one communication mode includes:
   determining whether the power state of the power supply is below a threshold, wherein if the power state of the power supply is below the threshold, only a first amount of data to transfer, which is less than a total amount of data to be transferred, is transferred using a first communication mode and a remainder of the amount of data to transfer is transferred using at least one other communication mode; and if the power state of the power supply is above the threshold the total amount of data is transferred using the selected at least one communication mode.

3. The method of claim 2, wherein the power supply includes a plurality of sources, and the first amount of data to transfer is selected such that the energy drain is less than the available energy of the power supply, and at least one of power drain and current drain is less than the corresponding at least one of power and current from a single one of the plurality of power sources.

4. The method of claim 3 wherein the selected at least one communication mode and first amount of data to transfer is further selected to minimize at least one of time and energy dissipation, to transfer the total amount of data.

5. The method of claim 1, wherein the power supply includes a plurality of power sources, and determining the power state includes determining the energy available from one source and the power available from another source.

6. The method of claim 5, wherein the plurality of power sources includes a fuel cell, and the method includes measuring the energy available from the power source.

7. The method of claim 6, wherein the plurality of power sources includes a super capacitor, and the method includes measuring the power available from the super capacitor.

8. The method of claim 6, wherein the plurality of power sources includes a battery, and the method includes measuring the power available from the battery.

9. The method of claim 1, wherein the power supply includes a plurality of power sources, wherein the at least one communication mode is selected from a plurality of available communication modes, the selected communication mode having energy drain less than the available energy from at least one of the power sources and at least one of power drain and current drain less than the corresponding at least one of power drain and current drain from at least one of the power sources.

10. The method of claim 9, wherein the step of selecting at least one communication mode includes selecting a communication mode to minimize at least one of the time and the energy dissipation required to transfer the total amount of data.

11. The method of claim 1, wherein the step of determining a power state further includes determining at least one of measured voltage and coulomb counting.

12. A method for data transmission in a wireless communication device, the wireless communication device having a power supply, comprising:
   determining a total amount of data to be transferred;
   determining a power state of the power supply, including an available amount of energy at a corresponding amount of at least one of power and current; and
   transferring the data, wherein if the power state of the power supply is below a threshold, only a first amount of data to transfer which is less than the total amount of data to be transferred is transferred and a remainder of the amount of data to transfer is transferred after at least one delay.

13. The method of claim 12, wherein the power supply includes a plurality of power sources, and determining the power state includes determining an energy available from one source and a power available from another source.

14. The method of claim 13, wherein the plurality of power sources includes a fuel cell, and the method includes measuring the energy available from the power source.

15. The method of claim 14, wherein the plurality of power sources includes a super capacitor, and the method includes measuring the power available from the super capacitor.

16. The method of claim 14, wherein the plurality of power sources includes a battery, and the method includes measuring the power available from the battery.

17. The method of claim 12, wherein the power supply includes a plurality of power sources, wherein a communication mode is selected from a plurality of available communication modes, the selected communication mode having energy drain less than the available energy from at least one of the power sources and at least one of power drain and current drain less than the corresponding at least one of power drain and current drain from a at least one of the power sources.

18. The method of claim 17, wherein the step of selecting at least one communication mode includes selecting at least one of communication mode is further selected to minimize at least one of time and energy dissipation, to transfer the total amount of data.

19. The method of claim 12, wherein the power supply includes a plurality of sources, and the first amount of data to transfer is selected such that the energy drain is less than the available energy of the power supply and at least one of power drain and current drain is less than the corresponding at least one of power and current from the plurality of power sources.

20. The method of claim 19 wherein the first amount of data to transfer is further selected to minimize at least one of time and energy dissipation, to transfer the total amount of data.

21. The method of claim 12, wherein the step of determining a power state further includes determining at least one of measured voltage and coulomb counting.

22. An apparatus for supplying power to a wireless communication device, comprising:
a power supply that includes a plurality of power sources; and
a power supply controller that determines a total amount of data to be transferred, determines an at least one available communication mode, determines a power state of the power supply, including an available amount of energy at a corresponding amount of at least one of power and current, selects at least one communication mode based on the determined available amount of energy of the power supply and the determined amount of data to be transferred, and transfers the data using the selected at least one communication mode.

23. The apparatus of claim 22, wherein the power supply controller determines whether the power state of the power supply is below a threshold, wherein if the power state of the power supply is below the threshold, only a first amount of data to transfer which is less than a total amount of data to be transferred is transferred using a first communication mode and a remainder of the amount of data to transfer is transferred using at least one other communication mode; and if the power state of the power supply is above the threshold the total amount of data is transferred using the selected at least one communication mode.

24. The apparatus of claim 22, wherein the power supply includes a plurality of power sources and the power controller determines the power state that includes determining the energy available from one source and the power available from another source.

25. The apparatus of claim 22, wherein the power supply controller selects at least one communication mode from among a plurality of available communication modes, the selected communication mode having energy drain less than the available energy of the power supply and at least one of power drain and current drain less than the corresponding at least one of power and current from at least one of the power sources.

26. The apparatus of claim 25, wherein the selected communication mode is selected to minimize at least one of the time and the energy dissipation required, to transfer the total amount of data.

27. The apparatus of claim 22, wherein the power supply controller determines at least one communication mode such that the energy drain is less than the available energy of the power supply and at least one of power drain and current drain is less than the corresponding at least one of power and current from the plurality of power sources.

28. The apparatus of claim 27, wherein the selected at least one communication mode is further selected to minimize at least one of time and energy dissipation, to transfer the total amount of data.

29. The apparatus of claim 22, wherein the wireless communication device may be a portable MP3 player, a satellite radio receiver, an AM/FM radio receiver, a satellite television, a portable music player, a portable laptop, a portable computer, a wireless radio, a wireless telephone, a portable digital video recorder, a cellular telephone, a mobile telephone, or a personal digital assistant.

* * * * *